Oct. 18, 1966    J. A. POPP    3,279,064
GRASS TRIMMING DEVICES
Filed Sept. 21, 1964
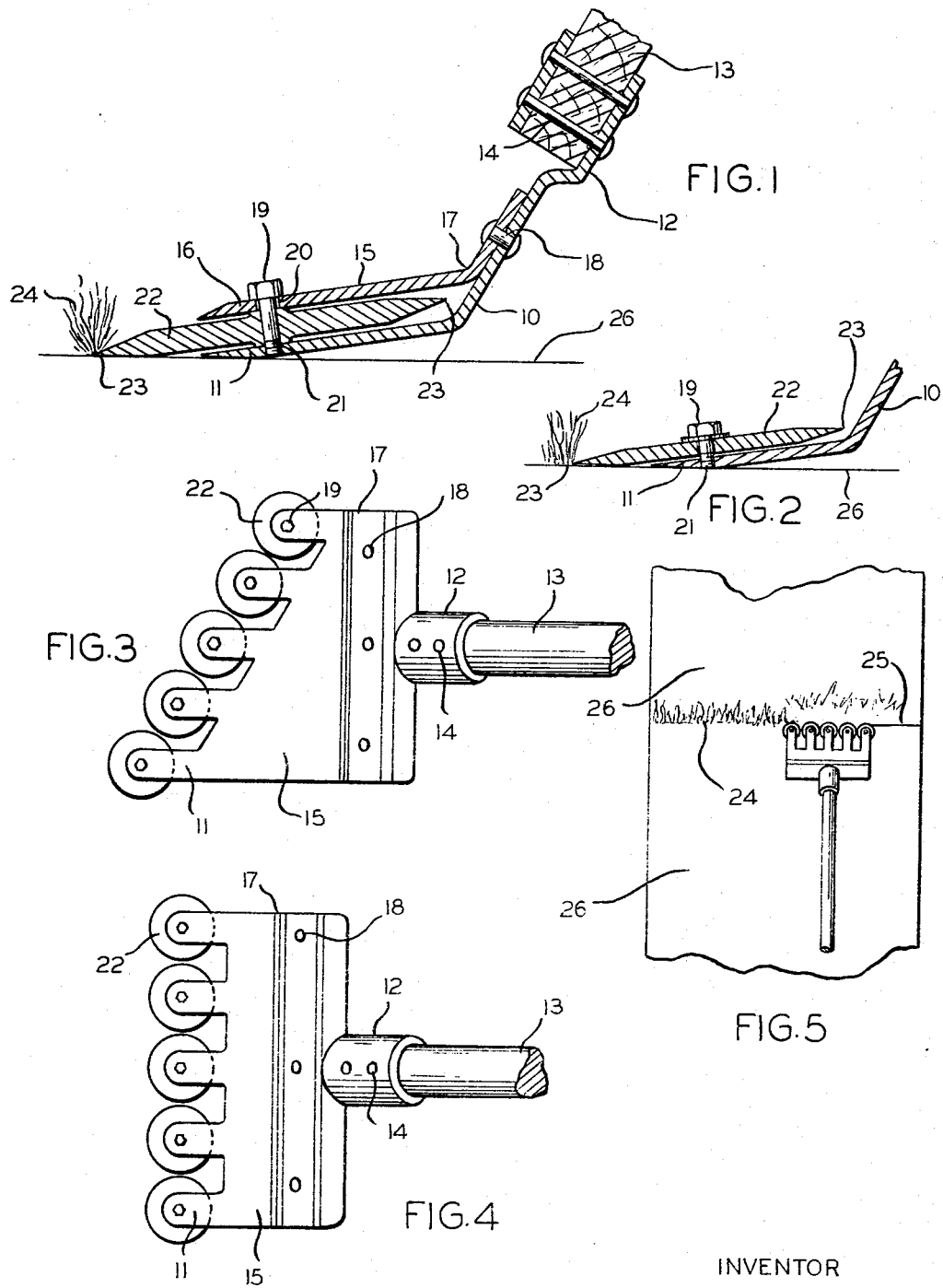
INVENTOR
JOHN A. POPP
BY
*Mullin and Alter*
ATTORNEYS 3,279,064
GRASS TRIMMING DEVICES
John A. Popp, 2847 S. 8th St., Milwaukee, Wis.
Filed Sept. 21, 1964, Ser. No. 397,966
2 Claims. (Cl. 30—307)

My invention relates to grass trimming devices, and more particularly to a device employed for trimming grass, weeds, or the like from walks or patio surfaces.

The prime object of my invention is to provide a device that will shear, or cut, protruding grass disposed within the cracks, or crevices of side walks, or paved areas, such as drive-ways, or the like.

Another object of my invention is to provide a device of the character described, that is designed for operation and function, without much physical effort.

Still another object of my invention is to provide a device, in which the shearing, or cutting blades may be easily removed and replaced when the cutting edges become dull.

It is manifest to anyone familiar with cutting and trimming lawns, or the like, that the conventional lawn mower or edge trimmer, is not a practical means for cutting vegetation such as crab-grass, weeds, or even the sod that grows in the cracks and crevices of the concrete walk, drive-way or patio. The device described, illustrated and claimed herein, provides a practical means of disposing of the weeds, or the like by applying a shearing action adjacent to the surface of the concrete, without any great effort, or mechanical skill.

Other and further objects of my invention will become more apparent as the description proceeds, when taken in conjunction with the drawings, in which:

FIG. 1 is a vertical cross-sectional view of the assembled device constituting my invention, with the cutting discs disposed between two support plates;

FIG. 2 is a similar view as shown in FIG. 1, with the discs rotatably supported on a single plate;

FIG. 3 is a top view of the device, with the revolving discs, mounted in angular alignment with one another;

FIG. 4 is a top view of a similar device with the revolving cutting discs disposed in straight alignment with one another; and FIG. 5 is a schematic view of the device as applied to the grass, or the like, protruding upward through the crack or crevice of a concrete walk.

Similar characters of reference indicate corresponding parts throughout the several views, and referring now to the same, the character 10 shows a substantially L-shaped support constructed of metal or the like. The support 10 is preferably formed at its top portion 12 to a cylindrical contour and is associated with a handle shown as 13, which may be constructed of wood, or metal, solid or tubular, and bent to any convenient form shape, or contour. The cylinder 12 is equipped with apertures, through which rivets or bolts shown as 14 are placed. The plate 10 has a bottom portion extending substantially transverse therefrom and having finger members 11 extending from its forward end.

In FIG. 1, I show a top plate 15 of the same shape and contour as the plate 10, and having outwardly extending members 16 in direct alignment with the members 11 on the plate 10. The top plate 15 is substantially transversely bent at 17, so it may be attached to the bottom plate 11 by means of the rivets 18, or in any other efficient manner.

The outwardly extending members 16 are equipped with apertures 20 to accommodate the bolts shown as 19 in FIG. 1. The finger members 11 have threaded apertures 21, which are in alignment with the apertures 20 so that when the bolts are positioned extending through the apertures 20, they threadedly engage the apertures 21, thereby sandwiching said discs 22 at their axes of rotation for journalling.

There are a plurality of circular discs 22 sharpened on their outer periphery 23, and equipped with centrally disposed apertures to accommodate the bolts 19 with respect to which the discs 22 are rotatably mounted. It will be seen from the drawing that the peripheries of the discs are proximately located with respect to each other when they are mounted on the bolts 19.

In FIG. 3, I show the discs 22 angularly disposed to provide a shearing edge when the device is applied to the crab-grass, or the like shown as 24. In FIG. 4, the centers or rotational axes of the discs 22 are disposed in straight alignment with one another. Therefore, as the discs 22, which are primarily shearing blades are forced against the weeds, or grass 24 (see FIG. 5), they will revolve and force the weeds 24 between the edges of the adjoining discs, thereby cutting the blades of grass or the like without much effort or thrust applied to the device.

The function and performance of the device will become apparent when referring to FIG. 5, which shows a row of grass or weeds 24, projecting upward from the "crack" or crevice shown as 25, and when the device is forced to make contact with the grass, the grass will be caused to be shreaded or cut, which function cannot be accomplished with any conventional mower, or the like.

The lower surface of the discs 22 are slidable on the pavement shown as 26 in FIGS. 1 and 2, and the discs may be easily removed and replaced after sharpening by just removing the bolts 19 on which the discs 22 are rotatably supported.

While I have shown a specific construction and arrangement of the various parts with modification, I am fully cognizant of the fact that many changes in the form, shape, and configuration of the parts may be made without effecting their operativeness, and I reserve the rights to make such changes as I may deem convenient or necessary without departing from the spirit of my invention, or the scope of the appended claims.

Having thus described my invention, what I claim and desire to secure by Letters Patent of the United States is:

1. A grass trimming device, to be used for cutting grass that grows in crevices of concrete, comprising: a handle, a bottom plate associated with said handle and having a top portion and bottom portion, said top portion being shaped to receive said handle, said bottom extending substantially transverse with respect to said top portion, a top plate of the same general contour as said bottom plate, said top plate having an upper portion that is associated with said bottom plate and a lower portion that has fingers extending therefrom, said top plate being attached to said bottom plate, said bottom portion of said bottom plate having a plurality of fingers extending outward therefrom, said fingers of said top and bottom plates being of the same length and being disposed in alignment and in opposing spaced apart relationship and a plurality of circular discs sharpened on their outer periphery, one of said discs being rotatably mounted between each pair of said fingers, said discs being sized and having their peripheries proximately located with respect to each other, said discs being disposed in alignment in one plane whereby the handle of said grass trimming device can be manipulated to cause said discs to be positioned in said crevices to shear said grass by forcing it between the edges of said discs.

2. A grass trimming device, as defined in claim 1, said fingers in said bottom plate each having a threaded aperture therein, said fingers in said top plate each having an aperture in alignment with said bottom plate, said discs having apertures at the rotational axes thereof in alignment with said apertures in said top and bottom plates, and threaded fastening means protruding through said apertures in said discs and threadedly engaging said bottom plate to journal said discs and provide means for removing said discs for sharpening.

References Cited by the Examiner

UNITED STATES PATENTS

| | | | |
|---|---|---|---|
| 226,146 | 3/1880 | Zimmerer | 30—299 |
| 1,435,514 | 11/1922 | Burns | 30—257 |
| 1,775,226 | 9/1930 | Rich | 30—299 |
| 2,112,271 | 3/1938 | Dalkowitz | 30—357 |
| 2,309,906 | 2/1943 | Kelsey | 30—299 |
| 2,890,525 | 6/1959 | Altendorf | 30—307 |
| 2,976,665 | 3/1961 | Speckman | 56—255 |

WILLIAM FELDMAN, *Primary Examiner.*

G. WEIDENFELD, *Assistant Examiner.*